United States Patent [19]

Lyall et al.

[11] 4,386,796
[45] Jun. 7, 1983

[54] PIPE REPAIR COUPLING

[75] Inventors: Robert W. Lyall, Fountain Valley; Donald C. Hill, Pasadena, both of Calif.

[73] Assignee: R. W. Lyall Co., Inc., Santa Fe Springs, Calif.

[21] Appl. No.: 287,357

[22] Filed: Jul. 27, 1981

[51] Int. Cl.³ .............................................. F16L 21/00
[52] U.S. Cl. ...................................... 285/31; 285/45; 285/302; 285/DIG. 16; 285/351
[58] Field of Search ............ 285/31, 32, 302, DIG. 16, 285/351, 45

[56] References Cited

U.S. PATENT DOCUMENTS

| 1,079,350 | 11/1913 | Kelly | 285/302 |
| 2,461,828 | 2/1949 | Lomelino . | |
| 2,497,986 | 2/1950 | Goode . | |
| 2,829,909 | 4/1958 | Magnani | 285/351 X |
| 3,084,869 | 4/1963 | Hutty et al. | 285/302 X |
| 3,695,634 | 10/1972 | White, Jr. . | |
| 3,826,521 | 7/1974 | Wilhelmsen . | |
| 3,971,574 | 7/1976 | Curtin | 285/31 |
| 4,023,831 | 5/1977 | Thompson . | |
| 4,063,760 | 12/1977 | Moreiras | 285/242 |
| 4,168,090 | 9/1979 | Kaufmann, Jr. | 285/302 |
| 4,350,372 | 9/1982 | Logsdon | 285/45 |

FOREIGN PATENT DOCUMENTS 732529 6/1955 United Kingdom ................. 285/45

Primary Examiner—Thomas F. Callaghan
Attorney, Agent, or Firm—Fulwider, Patton, Rieber, Lee & Utecht

[57] ABSTRACT

There is disclosed a pipe repair coupling including a barrel formed centrally with a hollow cylinder for telescopical receipt therein of a hollow piston. The barrel is surrounded by a protective sleeve and is formed at one extremity with a first fitting and at the opposite extremity with a neck portion. The piston is formed in its exterior with a plurality of annular O-ring grooves which receive O-rings for dynamic sealing engagement with the interior wall of the barrel. Telescoped within the hollow piston in the area of the O-rings is a tubular stiffener which supports the walls of such piston against radial inward collapse. Consequently, the piston may be telescoped into the cylinder to facilitate connection of the cylinder fitting to an end of a pipe which is aligned axially with a second end spaced therefrom. Such second end may then be easily connected with a fitting formed on the end of the free end of such piston.

10 Claims, 4 Drawing Figures

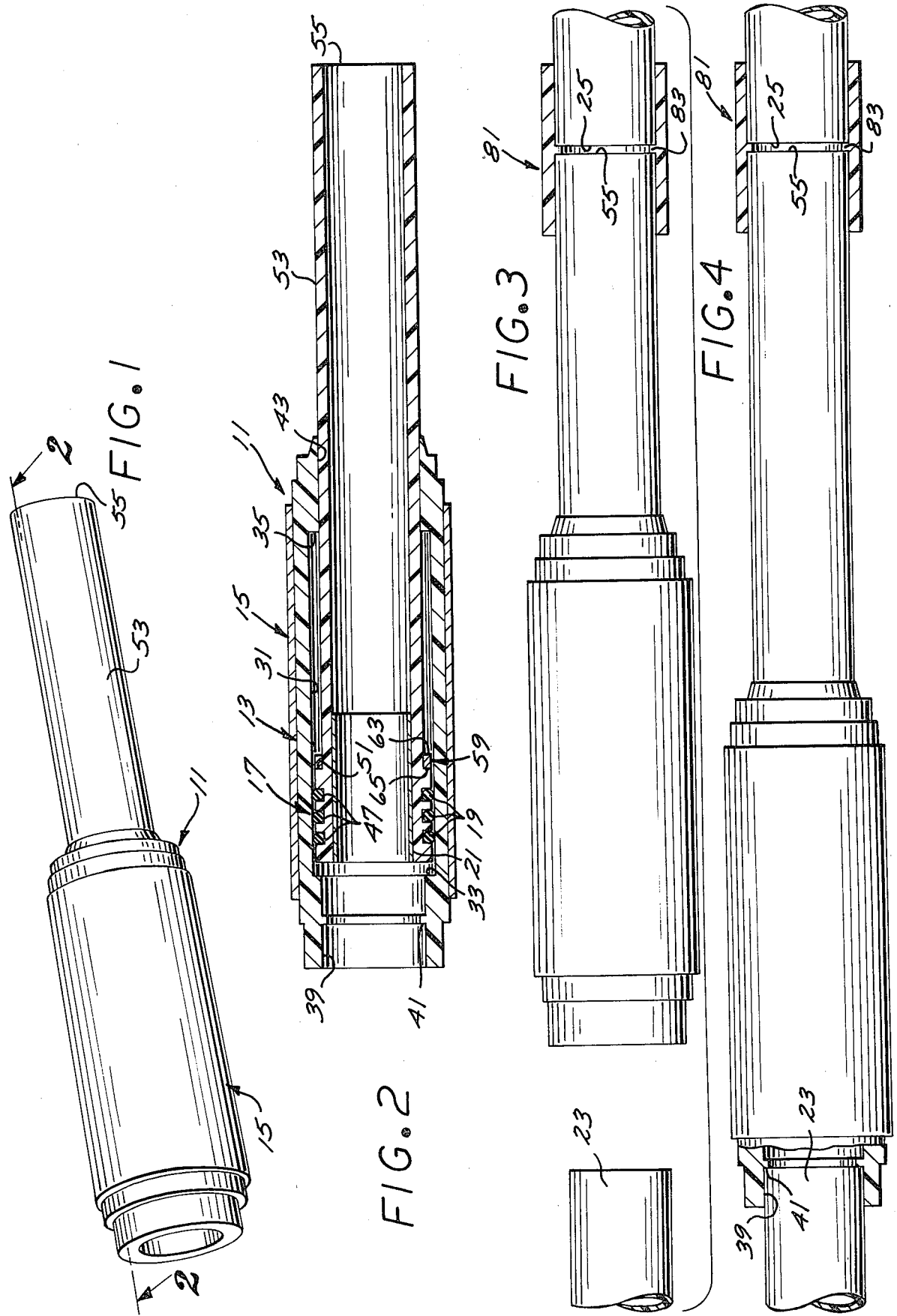

PIPE REPAIR COUPLING

BACKGROUND OF THE INVENTION

1. Field of the Invention

The present invention relates to the repair of damaged subterranean polyethylene pipes.

2. Description of the Prior Art

With the advent of polyethylene pipes which are commonly joined by fusion bonding, underground repair thereof has posed a significant problem. Once such underground pipes have been damaged, as by accidental encounter with excavation equipment or the like, repair thereof becomes an extremely time consuming and expensive project. This stems from the fact that bonding of such pipes typically requires some degree of relative axial shifting thereof in order to provide for the forming of flush butt ends which must be heated in a plane perpendicular to the axial direction of the pipe and then slid axially together for proper fusion thereof. Early efforts to solve this problem involved excavating laterally outwardly from the underground line at points some 20 feet apart for a distance of some 20 feet and then joining such excavation with another trench disposed parallel to but offset from the main line some 20 feet. Lateral lines are then joined with the main line and joined at their remote extremities with an offset pipe located in such longitudinal trench. It will be appreciated that fusion of the repair lines is facilitated by the fact that the lateral lines may flex apart at their remote ends a distance sufficient to enable joinder of such remote ends by such offset pipe. Such excavation and laying of bypass lines is expensive and time consuming.

Efforts to solve this problem have led to the proposal of polyurethane fittings formed with a tubular body having coupling members bonded to the opposite ends thereof with one such coupling member being formed with interior seals which seal dynamically with a tube received telescopically within the tubular body. A device of this type is shown in U.S. Pat. No. 4,023,831. However, such devices suffer the shortcoming that the seals are exposed directly to the telescopical tube and to any foreign matter, dirt or debris which may be carried on such tube as it telescopes inwardly and outwardly within the body member. Moreover, such devices suffer the shortcoming that when axial tension is applied to the tubular member it tends to neck downwardly in the area of the seal, thus breaking sealing engagement between such seals and the tube and consequently, such couplings have not gained general acceptance in the marketplace.

SUMMARY OF THE INVENTION

The present invention is characterized by a hollow cylinder formed with a barrel sheathed in a cylindrical protective sleeve and having received telescopically thereinto, a hollow piston carrying in its exterior, a plurality of dynamic seals for sealing with such barrel. The piston has an interior stiffener sleeve received coaxially therein to support the wall of the piston against radially inward collapse.

These and other features of the invention will become apparent from a consideration of the following detailed decription of the drawings.

DESCRIPTION OF THE DRAWINGS

FIG. 1 is a perspective view of a pipe repair coupling embodying the present invention;

FIG. 2 is a longitudinal sectional view, in enlarged scale, taken along the line 2—2 of FIG. 1;

FIG. 3 is a side view, partially in section, of the pipe repair coupling shown in FIG. 1 and depicting joinder with pipe ends; and FIG. 4 is a side view, partially in section, similar to FIG. 3, but showing the pipe ends joined.

DESCRIPTION OF THE PREFERRED EMBODIMENT

Referring to FIG. 2, the pipe repair coupling of the present invention includes, generally, a cylinder 11 formed centrally with a barrel 13 encased within a tubular protective sleeve 15. Received within the cylinder 13 is a hollow piston, generally designated 17, carrying at one extremity, a plurality of exterior O-rings 19 for sealing with the interior surface of the wall of the barrel 13. Received coaxially within the piston 17 is a tubular stiffening sleeve 21 which supports such piston against radial inward collapse. Consequently, the piston 17 may be selectively telescoped into the cylinder 11 to facilitate receipt thereof in the space between spaced apart pipe ends 23 and 25 (FIG. 3). The piston 17 may then be telescoped axially outwardly to facilitate joinder of such coupling to the pipe ends. Thereafter, when the trench receiving such coupling is filled, the sleeve 15 will afford support against radially inward collapse of the barrel 13. Should bending forces subsequently be applied to the coupling, the stiffener sleeve 21 will afford support against flattening of or radial inward collapse of the wall of the piston 17 and consequent breaking of the seal with the interior surface of the wall of the barrel 13.

Referring to the drawings in detail, the cylinder 11 is conveniently constructed of polyethylene and the barrel 13 is formed centrally therein by a counterbore 31, the walls of which define an interior sealing surface, such bore terminating at its left hand end in an annular shoulder 33 and in its right hand end in an annular shoulder 35. Still referring to FIG. 2, the left hand end of the cylinder 11 is necked down beyond the shoulder 33 to form a bore 39 formed medially with an annular ring 41 which defines a butt stop for the pipe end as shown in FIG. 4.

Referring back to FIG. 2, the right hand end of the barrel 13 is necked down to form a reduced in diameter neck defining a bore protective sleeve 43 for telescopical receipt of a connector tube 53 projecting from the piston 17.

The protective sleeve 15 may be constructed of any desirable material having sufficient strength to afford support against the weight of fill received thereon and is typically constructed of metal. The sleeve 15 itself is sized to be press fit on the cylinder to be held frictionally in place.

The piston 17 is formed in its exterior with three longitudinally spaced apart, radially outwardly opening O-ring glands 47 which receive the O-rings 19. The piston is open on its left end and reduced in exterior diameter medially to form an annular shoulder 51. The connector tube 53 projects therefrom to define at its free extremity, a butt end fitting 55. A female fitting generally designated 81 (FIG. 3), may then be bonded to the butt end 55 of the connector tube 53 by heating such butt end to its melting temperature and sliding such fitting 81 thereonto to fuse such end against a medial bonding ring 83.

Received within the cylinder 13 and telescoped over the tube 53, is a circular sandwich ring 59 which abutts on one side against the shoulder 51 and is positioned to engage its opposite side with the barrel shoulder 35. It will be noted that such ring is square in cross section and is formed with axially oppositely facing parallel faces 63 and 65. The collar 59 is constructed of metal which has a greater resistance to deformation than the polyethylene material from which the barrel and piston are constructed to thus resist the tendency direct engagement between the shoulder 51 and 35 would have under axial forces to deform one or the other or both of such shoulders resulting in the shoulder 51 essentially wedging radially inside the shoulder 35 and consequent separation of the piston and shoulder.

The stiffener sleeve 21 is constructed of metal and is press fit within the piston 17 and is of sufficient length to project axially beyond the planes of the outermost O-rings 19.

In operation, when an underground polyethylene pipe is damaged, the area adjacent thereto may be excavated to fully expose the damage cite. The damaged portion may be removed by severing the pipe to expose the aligned and confronting ends 23 and 25 (FIG. 3), which are cut in a plane perpendicular to the longitudinal axis of such pipe and are spaced apart a distance of approximately 24 inches. The coupling of the present invention may then be positioned between the spaced apart ends 23 and 25 with the pistons 17 telescoped within the cylinder 13 as shown in FIG. 2.

The pipe end 25 may then be heated to its melting point and the open end of the fitting telescoped thereover to fuse the bonding ring 83 to such end 25. The pipe end 23 may then be heated to its melting point and the cylinder 13 then telescoped axially outwardly on the piston 17 to receive the pipe end 23 within the bore 39 for pressing engagement with the bonding ring 41 to form a fusion bond therewith. The recoupling of the pipe ends 23 and 25 is then complete and the excavation may then be filled.

It will be appreciated that during filling of such excavation, the protective sleeve 15 will support the weight of the fill to prevent squatting of the barrel 13 which may result in breaking of the seal with the O-rings 47. Furthermore, should any bending forces be applied to the coupling, as by bending forces between the pipe ends 23 and 25, the tendency of the walls of the piston 17 to assume a flat or non-round configuration will be resisted by the stiffener sleeve 21 to thus maintain the integrity of the seal between the piston and cylinder. Likewise, when the piston tube 53 is drawn axially outwardly relative to the cylinder 13 to its fully extended position, the flat annular surface 63 of the ring 59 will engage the annular shoulder 35 to maintain a confronting engaging surface therebetween and resist the tendency of the barrel shoulder 35 and the piston shoulder 51 to deform from the plane perpendicular to the axis of the tube 53, thus resisting tendency of such shoulders to wedge with respect to one another. Continued drawing of the tube 53 relative to the cylinder 13 will tend only to neck the tube down at a point located to the right hand end of the stiffener sleeve 21, thus maintaining the integrity of the seal between the piston and cylinder.

From the foregoing, it will be appreciated that the coupling of the present invention provides an economic and effective means for repairing a damaged subterranean pipe in a convenient and straightforward manner.

I claim:

1. A pipe repair coupling of organic thermoplastic polymeric material for joining aligned, spaced apart first and second pipe ends and comprising:
    a cylinder formed medially with a barrel defining an interior cylindrical sealing surface and having first and second extremities, said first extremity being formed with a first fitting for being bonded to said first pipe end and said second extremity being formed with a neck;
    a cylindrical protective sleeve surrounding said barrel to support weight applied to the exterior thereof;
    a hollow piston telescopically received in said cylinder and including a plurality of seals for cooperating with said sealing surface in forming a dynamic seal, said piston further including a tube projecting telescopically through said neck and formed on its free end with a second fitting for joining with said second pipe end; and,
    a cylindrical stiffener sleeve in said piston and surrounded by said seals, whereby said piston may be telescoped axially into said cylinder to facilitate joining said first and second fittings with said first and second pipe ends and said protective sleeve will protect said cylinder from exterior forces and when the binding forces are applied to said coupling, said stiffener sleeve will support the walls of said piston from collapsing radially inwardly and consequently, breaking the sealing engagement between said seals and said sealing surface.

2. A pipe repair coupling as defined in claim 1 wherein:
    said one end said barrel is reduced in diameter to form a first annular limit shoulder facing said piston;
    said piston is reduced in exterior diameter to form a second annular limit shoulder facing said first limit shoulder, said piston being further formed with a projecting tube; and,
    when said coupling includes a sandwich ring telescoped in said tube and sandwiched between said first and second limit shoulders.

3. A pipe repair coupling as defined in claim 1 wherein:
    said protective sleeve projects at least the full length of said barrel.

4. A pipe repair coupling as defined in claim 1 wherein:
    said stiffener sleeve projects axially the full length of said piston.

5. A pipe repair coupling as defined in claim 1 wherein:
    said piston is formed with three axially spaced apart radially outwardly opening O-ring glands; and,
    said seals include O-rings received in said respective glands.

6. A pipe repair coupling as defined in claim 1 wherein:
    said cylinder is of substantially uniform cross section throughout the length of said barrel and then, at its opposite extremities, has its exterior stepped radially inwardly.

7. A pipe repair coupling as defined in claim 2 wherein:

said protective sleeve projects at least the full length of said barrel.

8. A pipe repair coupling as defined in claim 2 wherein:

said stiffener sleeve projects axially the full length of said piston.

9. A pipe repair coupling as defined in claim 2 wherein:

said piston is formed with three axially spaced apart radially outwardly opening O-ring glands.

10. A pipe repair coupling as defined in claim 2 wherein:

said barrel is of substantially uniform cross section throughout the length thereof.

* * * * *